US008789440B2

(12) United States Patent
Kim et al.

(10) Patent No.: US 8,789,440 B2
(45) Date of Patent: Jul. 29, 2014

(54) MANIPULATOR WITH WEIGHT COMPENSATION MECHANISM AND FACE ROBOT USING THE SAME

(75) Inventors: Seung Jong Kim, Seoul (KR); Chang Hyun Cho, Seoul (KR); Jeong Soo Choi, Gyeonggi-do (KR); Kyung Geune Oh, Seoul (KR); Chan Yul Jung, Gyeonggi-do (KR)

(73) Assignee: Korea Institute of Science and Technology, Seoul (KR)

( * ) Notice: Subject to any disclaimer, the term of this patent is extended or adjusted under 35 U.S.C. 154(b) by 321 days.

(21) Appl. No.: 13/314,383

(22) Filed: Dec. 8, 2011

(65) Prior Publication Data

US 2013/0061709 A1 Mar. 14, 2013

(30) Foreign Application Priority Data

Sep. 14, 2011 (KR) ........................ 10-2011-0092421

(51) Int. Cl.
*B25J 17/00* (2006.01)

(52) U.S. Cl.
USPC ........................... 74/490.01; 901/48; 414/720

(58) Field of Classification Search
CPC . B25J 19/0016; B25J 17/0241; B25J 19/0012
USPC ........ 74/490.01; 901/48; 248/298.31, 292.11; 414/720
See application file for complete search history.

(56) References Cited

U.S. PATENT DOCUMENTS

| 4,300,198 | A | * | 11/1981 | Davini | 700/264 |
| 4,507,043 | A | * | 3/1985 | Flatau | 414/719 |
| 4,598,601 | A | * | 7/1986 | Molaug | 74/469 |
| 4,613,278 | A | * | 9/1986 | Bilsing | 414/736 |
| 4,653,975 | A | * | 3/1987 | Akeel | 414/720 |
| 4,659,280 | A | * | 4/1987 | Akeel | 414/720 |
| 4,676,002 | A | * | 6/1987 | Slocum | 33/1 MP |
| 2010/0300230 | A1 | * | 12/2010 | Helmer | 74/469 |
| 2011/0072930 | A1 | * | 3/2011 | Bayer et al. | 74/490.01 |
| 2011/0271784 | A1 | * | 11/2011 | Kang et al. | 74/490.01 |
| 2012/0186380 | A1 | * | 7/2012 | Yamada et al. | 74/490.01 |
| 2012/0291582 | A1 | * | 11/2012 | Kang et al. | 74/490.03 |
| 2013/0061709 | A1 | * | 3/2013 | Kim et al. | 74/490.05 |
| 2013/0180353 | A1 | * | 7/2013 | Kang et al. | 74/490.04 |
| 2013/0192396 | A1 | * | 8/2013 | Quaid | 74/96 |

FOREIGN PATENT DOCUMENTS

| JP | 2003-181789 A | 7/2003 |
| JP | 2006-320424 | 11/2006 |
| KR | 10-1985-0000649 B1 | 5/1985 |

* cited by examiner

*Primary Examiner* — David M Fenstermacher
(74) *Attorney, Agent, or Firm* — NSIP Law

(57) ABSTRACT

This disclosure relates to a face robot which is operated similarly to the motion of a human head and a multi-joint manipulator which supports a robot's face, and more particularly, to a structure which may compensate an influence caused by the gravity and exerted on rotation parts rotating about its axes. A manipulator with a weight compensation mechanism of the disclosure is provided, the manipulator having rotation parts connected to a plurality of axes rotating about their axes, the manipulator including: a weight compensation mechanism that supports wires connected to the rotation parts receiving gravity in a rotation state by a spring and compensates an influence of gravity exerted on the rotation parts.

21 Claims, 15 Drawing Sheets

MANIPULATOR WITH WEIGHT COMPENSATION MECHANISM AND FACE ROBOT USING THE SAME

CROSS-REFERENCE TO RELATED APPLICATION

This application claims priority to Korean Patent Application No. 10-2011-0092421, filed on Sep. 14, 2011, and all the benefits accruing therefrom under 35 U.S.C. §119, the contents of which in its entirety are herein incorporated by reference.

BACKGROUND

1. Field

This disclosure relates to a face robot which is operated similarly to the motion of a human head and a multi-joint manipulator which supports a robot's face, and more particularly, to a structure which may compensate an influence caused by the gravity and exerted on rotation parts rotating about its axes.

2. Description of the Related Art

In recent years, various kinds of robots have been developed so as to make the human's living environment more convenient or assist work in industrial fields. Especially, developed are many robot arms which are utilized in various industrial fields such as painting and welding. It is very important that the robot arms need to produce high torque, since such industrial multi-joint robot arms need to transfer and support a heavy load.

The multi-joint robot arm receives load torque due to the own weight thereof or the weight of the load, and the load torque directly affects the design of a driving unit such as a driving motor. In particular, the proportion of the torque element generated by the own weight of the robot arm in the load exerted on the driving motor is considerably high.

In the case where the capacity of the driving unit of the robot arm is determined in the related art, not only the torque generated by the load but also the gravity torque generated by the own weight of the robot arm need to be taken into consideration, which has a disadvantage in that the capacity of the power source for driving the robot arm inevitably increases.

Even in a robot face which is developed so as to move similarly to the motion of the human head, the proportion of the torque element generated by the own weight of the head is considerably high, which also causes a problem in that the capacity of a power source for driving a neck part needs to be increased.

In addition, simple ideas having a concept of theoretically compensating the gravity generated by the own weight of the robot arm or the like have been proposed, but any mechanism practically adopting the ideas cannot be developed yet. Furthermore, in the face robot, the structure of the neck joint is complex and the installation space thereof is not sufficiently ensured, which hinders the application example that employs the gravity compensation.

SUMMARY

This disclosure is directed to providing a manipulator which includes a weight compensation mechanism configured to reduce the capacity of an actuator necessary for a driving operation by compensating the gravity exerted on a rotation part of the manipulator corresponding to a neck part of a face robot using the elastic force of a spring and a face robot using the same.

Furthermore, this disclosure is directed to providing a manipulator which includes a weight compensation mechanism configured to be easily installed at a narrow space by compensating the gravity of the manipulator from the outside of a neck part using a wire for compensating the gravity of the manipulator corresponding to the neck part of the face robot with a narrow space and a face robot using the same.

In one general aspect, there is provided a manipulator with a weight compensation mechanism, the manipulator having rotation parts connected to a plurality of axes rotating about their axes, the manipulator including: a weight compensation mechanism that supports wires connected to the rotation parts receiving gravity in a rotation state by a spring and compensates an influence of gravity exerted on the rotation parts when the wires pressurize the spring or cancel the pressurized state thereof due to the rotation of respective rotation parts by the elastic restoring force of the spring.

Furthermore, according to the preferred embodiment of the disclosure, the axes of the manipulator may be divided into a first axis (yaw) matching the direction of gravity, a second axis (pitch), a third axis (pitch), and a fourth axis (roll). The manipulator may include a first rotation part that rotates about each of the first axis and the second axis and a second rotation part that rotates about each of the third axis and the fourth axis. A first wire of the weight compensation mechanism may be connected to the first rotation part and a second wire of the weight compensation mechanism may be connected to the second rotation part, thereby compensating the gravity generated when the first rotation part rotates about the second axis and the second rotation part rotates about the third axis and the fourth axis.

Furthermore, according to the preferred embodiment of the disclosure, the manipulator may include a first rotational bracket that is attached to the first axis fixed to a base plate and is rotatable about the first axis, a second rotational bracket that is rotatable about the third axis, and a connecting link that is connected to each of the first rotational bracket and the second rotational bracket through a first rotational joint and a second rotational joint so as to be relatively rotatable, and the second axis, the third axis, the first rotational joint, and the second rotational joint may constitute a parallelogram structure.

Furthermore, according to the preferred embodiment of the disclosure, the weight compensation mechanism may be divided into a first weight compensation part that compensates the gravity of the first rotation part and a second weight compensation part that compensates the weight of the second rotation part, the weight compensation mechanism may be installed at the bottom surface of the base plate provided with the manipulator, and the first wire and the second wire may extend in the direction of the first axis so as to be respectively connected to the first rotation part and the second rotation part.

Furthermore, according to the preferred embodiment of the disclosure, the first weight compensation part may include a guide bar that is fixed to the outside of the base plate at the first axis, a slider that moves along the guide bar, a sheave that is attached to the slider, a coil spring that provides an elastic restoring force of pushing the slider to the outside of the base plate, a tension controller to which one end of the first wire is fixed, and a first pulley that switches the direction of the first wire so that it extends in the direction of the first axis. The first wire of which one end is fixed to the tension controller may extend in the direction of the first axis through the sheave and the first pulley and may be fixed to the first rotation part.

Furthermore, according to the preferred embodiment of the disclosure, the first wire may pass through a hollow of the first axis and pass a second pulley attached to the first rotational bracket so that the other end of the first wire is fixed to a fixture attached to the first rotation part.

Furthermore, according to the preferred embodiment of the disclosure, the second weight compensation part may include a guide bar that is fixed to the outside of the base plate at the first axis, a slider that moves along the guide bar, a sheave that is attached to the slider, a coil spring that provides an elastic restoring force of pushing the slider to the outside of the base plate, a tension controller to which one end of the second wire is fixed, and a third pulley which switches the direction of the second wire so that it extends in the direction of the first axis. The second wire of which one end is fixed to the tension controller may be fixed to the second rotation part through the sheave and the first pulley, and pulleys supporting the second wire may be attached to the first rotational bracket, the connecting link, and the second rotational bracket.

Furthermore, according to the preferred embodiment of the disclosure, a second wire fixing part may be attached to the second rotation part, and the second wire fixing part may include a wire fixture that is rotatably attached to the second rotation part and a through hole that is formed in the lateral direction of the wire fixture so that the second wire passes therethrough and forms a slope in an entrance part to which the second wire is inserted.

Furthermore, according to the preferred embodiment of the disclosure, the second wire fixing part may include a fixing block that is attached and fixed to the front side of the second rotation part and supporting brackets that are fixed to both side surfaces of the fixing block and support the wire fixing part so as to be rotatable, and the other end of the second wire may pass through the second rotation part and the fixing block and be fixed to the inside of the through hole of the wire fixing part or the outer peripheral surface of the wire fixing part.

Furthermore, according to the preferred embodiment of the disclosure, a pulley assembly, which supports the second wire so that the second wire is positioned toward the second rotation part, may be attached to the second rotational bracket, and the pulley assembly may be rotatably attached to the second rotational bracket so as to be directed toward the second rotation part rotating about each of the third axis and the fourth axis.

Furthermore, according to the preferred embodiment of the disclosure, the pulley assembly may include a hollow shaft that is rotatably attached to the second rotational bracket, a rotation holder that is fixed to the upper end of the hollow shaft, and a pulley that is attached to the inside of the rotation holder, and the second wire may pass thorough the inside of the hollow shaft and extend toward the second rotation part through the pulley.

Furthermore, according to the preferred embodiment of the disclosure, a second wire guide may be attached to the rotation holder so that the second wire is guided toward the second rotation part.

Furthermore, according to the preferred embodiment of the disclosure, a fourth pulley which supports the second wire may be attached to the first rotational bracket, and pulleys which support the second wire so that the second wire extends toward the pulley assembly may be attached to the connecting link.

Furthermore, according to the preferred embodiment of the disclosure, in the manipulator, a first differential bevel gear may be attached between the first rotation part and a base so that the first rotation part rotates about the first axis and the second axis and a second differential bevel gear may be attached between the first rotation part and the second rotation part so that the second rotation part rotates about the third axis and the fourth axis.

Furthermore, according to the preferred embodiment of the disclosure, the first differential bevel gear may include a fixation gear that is fixed to the upper end of the first axis and two movement gears that are rotatably attached to the second axis, the first rotational bracket may be fixed to the upper end of the first axis, the second axis may be rotatably attached to the first rotational bracket, and the first rotation part may be rotatably attached to the second axis.

Furthermore, according to the preferred embodiment of the disclosure, two first actuators may be attached to the first rotation part, two first actuators may be connected to two movement gears so as to rotate the movement gears, and the first rotational bracket and the first rotation part may rotate about the first axis or the first rotation part may rotate about the second axis in accordance with the rotation directions of the movement gears.

Furthermore, according to the preferred embodiment of the disclosure, the second differential bevel gear may include a fixation gear which is fixed to the second rotation part and of which the center is fixed with the fourth axis and two movement gears that are rotatably attached to the third axis, the second rotational bracket may be rotatably fixed to the end of the fourth axis, the third axis may be rotatably attached to the second rotational bracket, and the second rotation part may be rotatably attached to the third axis.

Furthermore, according to the preferred embodiment of the disclosure, two second actuators may be attached to the first rotation part, two second actuators may be connected to two movement gears so as to rotate the movement gears, and the second rotation part may rotate about the third axis or the second rotation part may rotate about the fourth axis in accordance with the rotation directions of the movement gears.

Furthermore, according to the preferred embodiment of the disclosure, the tension controller may be a self-locking bolt to which one end of the first wire is fixed, and the self-locking bolt may be fastened to a nut fixed to the first weight compensation part.

Furthermore, according to the preferred embodiment of the disclosure, the tension controller may be a self-locking bolt to which one end of the second wire is fixed, and the self-locking bolt may be fastened to a nut fixed to the second weight compensation part.

Furthermore, in another aspect of the disclosure, there is provided a face robot including: a manipulator in which rotation parts connected to a plurality of axes rotate about their axes, and a weight compensation mechanism that supports wires connected to the rotation parts receiving gravity in a rotation state by a spring and compensates an influence of gravity exerted on the rotation parts when the wires pressurize the spring or cancel the pressurized state thereof due to the rotation of respective rotation parts by the elastic restoring force of the spring, wherein the axes of the manipulator are divided into a first axis (yaw) matching the direction of gravity, a second axis (pitch), a third axis (pitch), and a fourth axis (roll), wherein the manipulator includes a first rotation part that rotates about each of the first axis and the second axis and a second rotation part that rotates about each of the third axis and the fourth axis, wherein a first wire of the weight compensation mechanism is connected to the first rotation part and a second wire of the weight compensation mechanism is connected to the second rotation part, thereby compensating the gravity generated when the first rotation part rotates about the second axis and the second rotation part rotates about the third axis and the fourth axis, and wherein a robot's face is attached to the second rotation part.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Hereinafter, exemplary embodiments of a manipulator including a weight compensation mechanism and a face robot using the same according to the disclosure will be described in detail with reference to the accompanied drawings.

Figure 1:
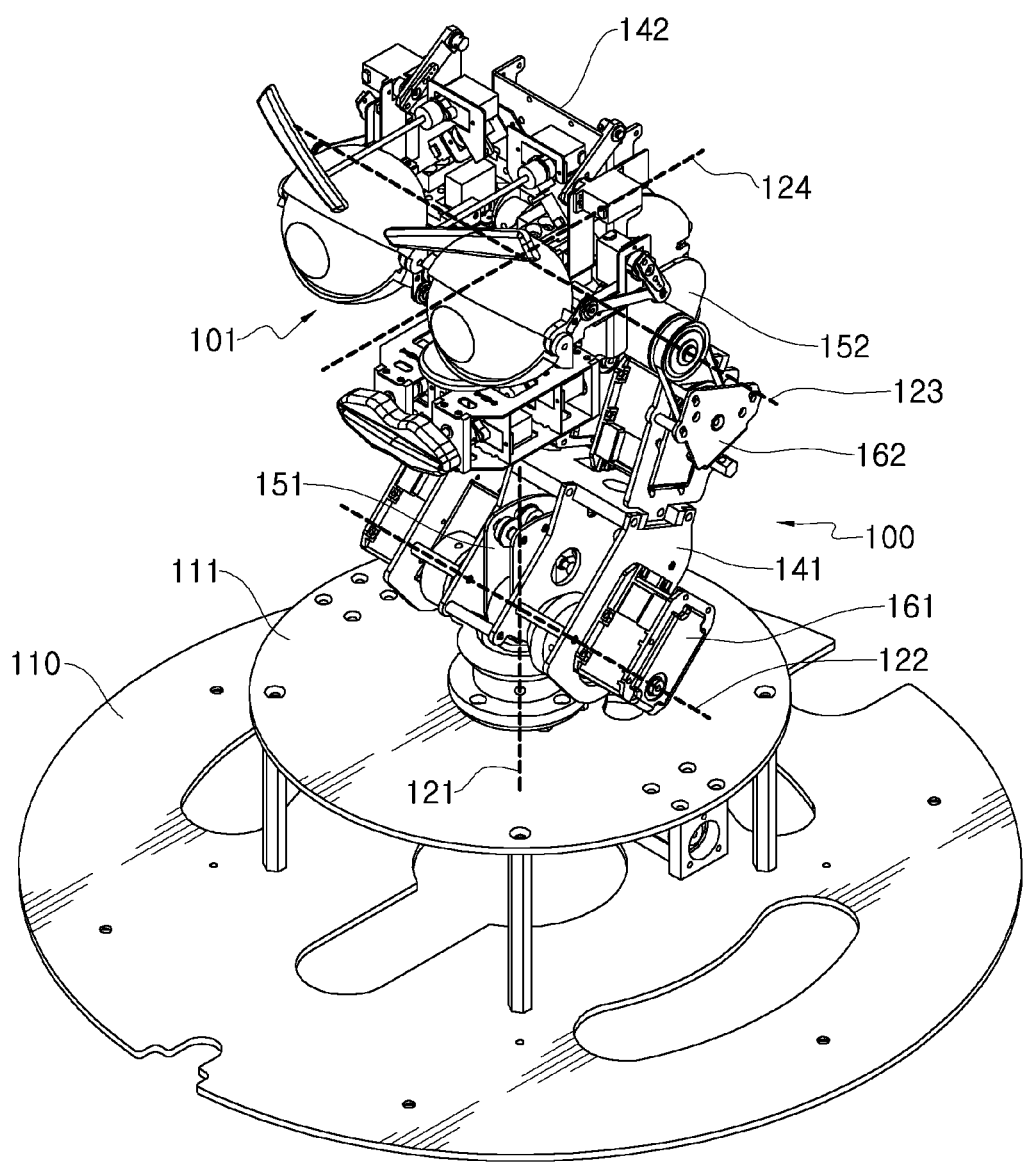
FIG. 1 is a perspective view showing a face robot according to the disclosure.
Figure 2:
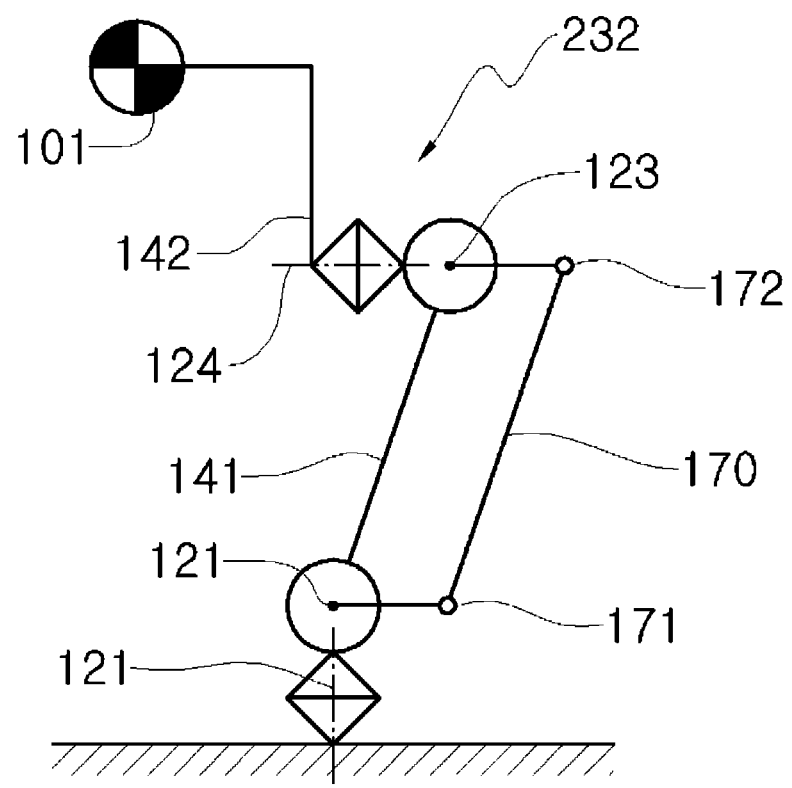
FIG. 2 is an operating conceptual diagram of a manipulator, which shows the operation of the face robot shown in FIG. 1.
Figure 3A:
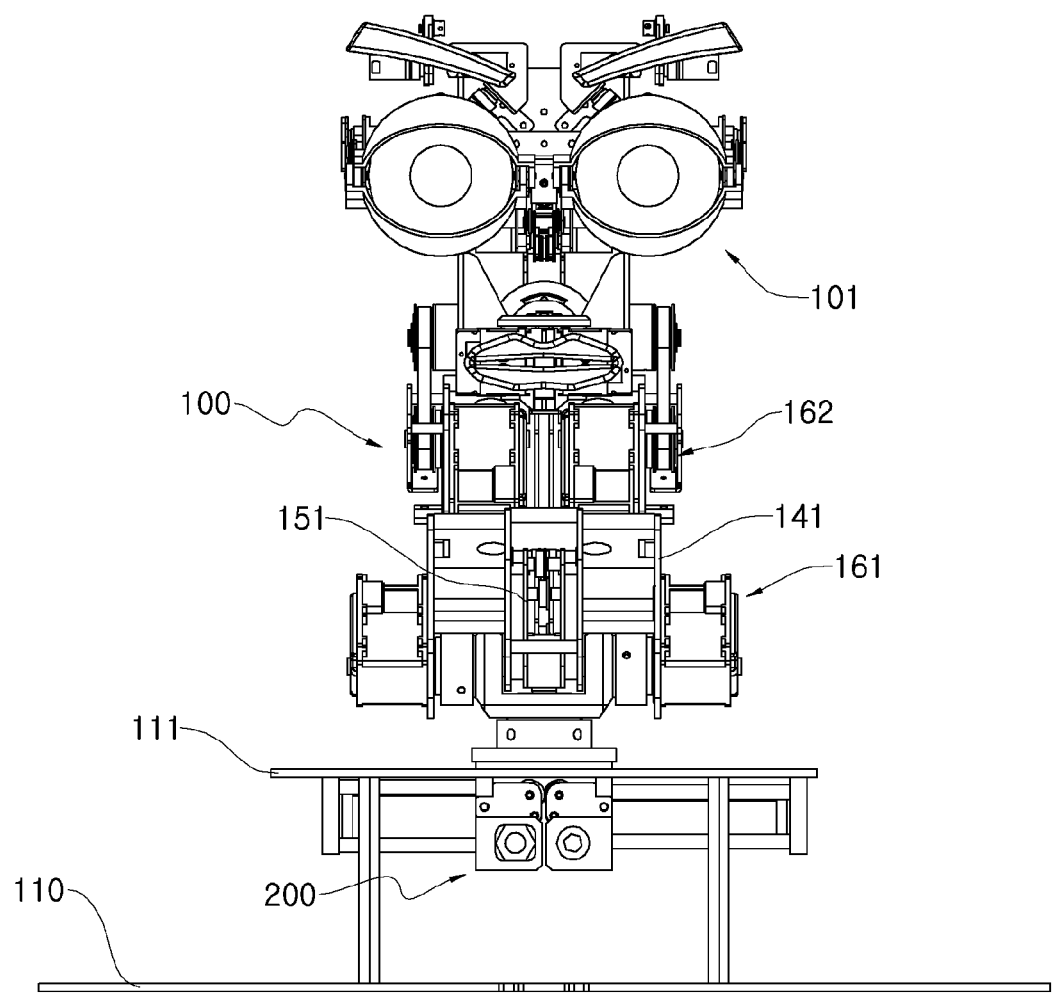
FIG. 3A is a front view of the face robot shown in FIG. 1.
Figure 3B:
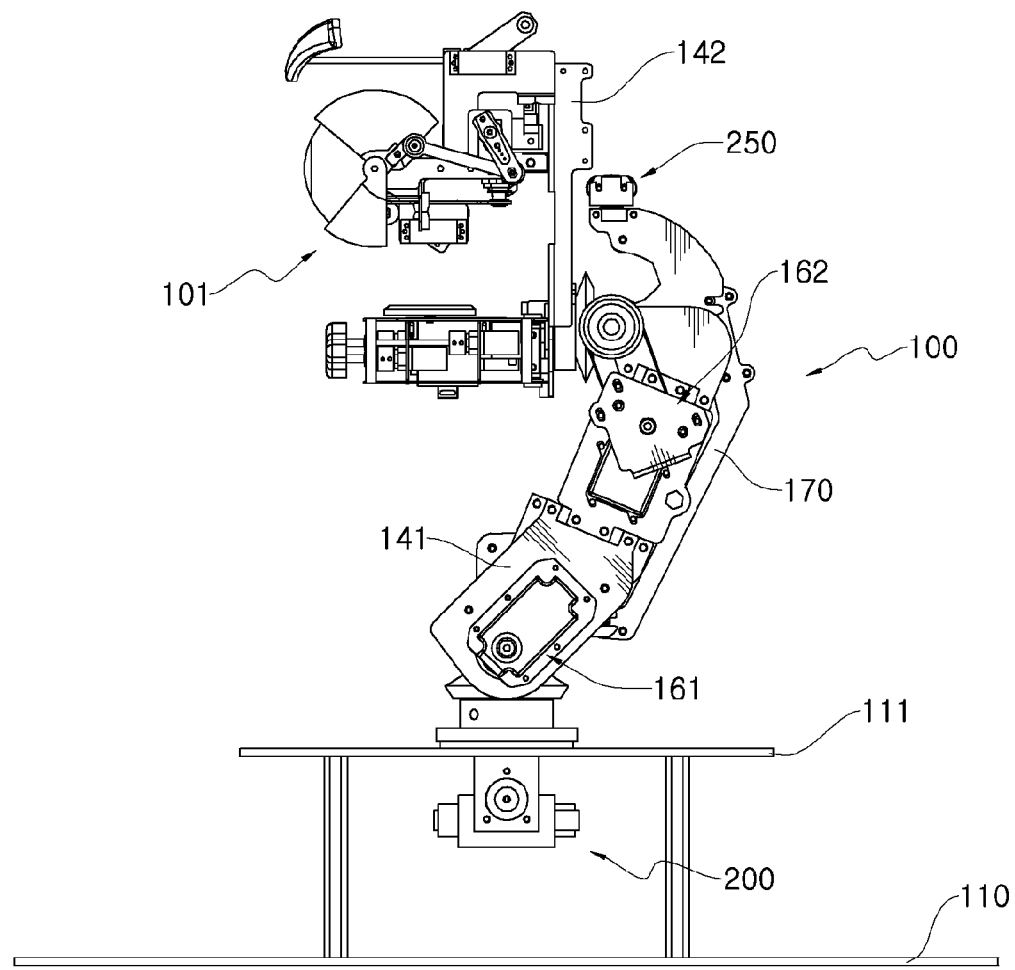
FIG. 3B is a side view of the face robot shown in FIG. 1.
Figure 4A:
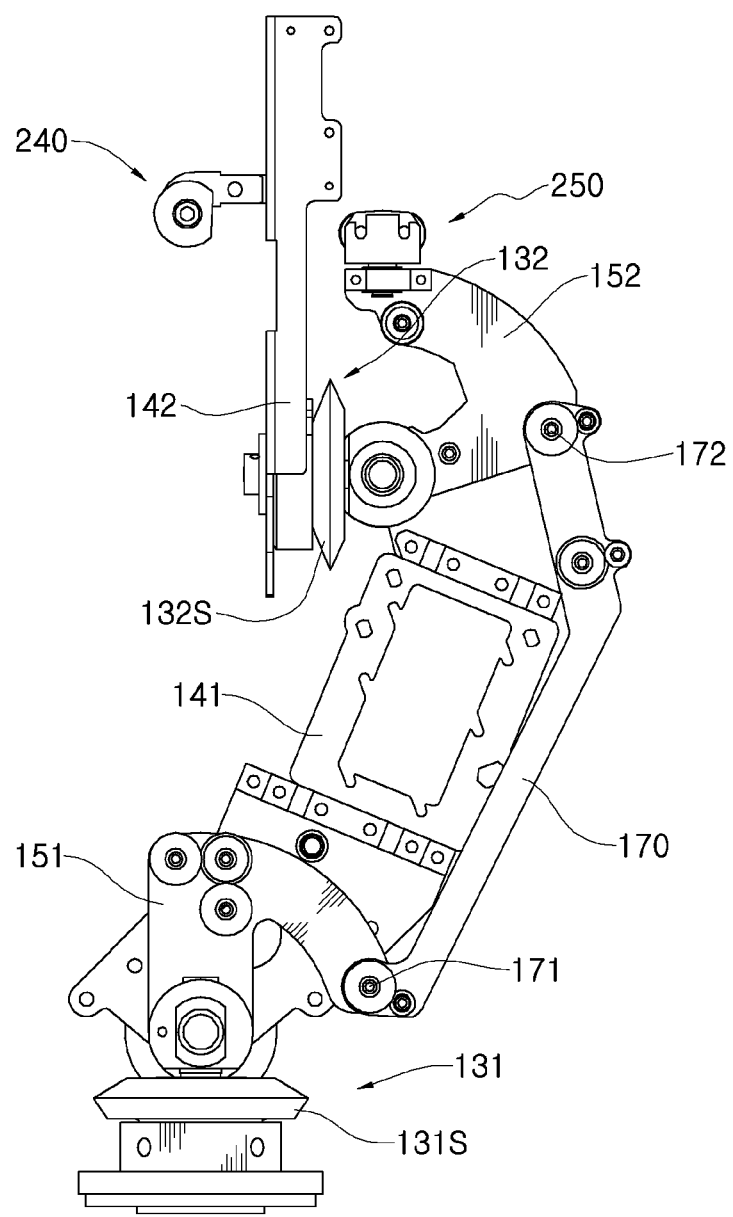
FIG. 4A is a conceptual diagram showing the parallelogram connecting structure of a second axis, a third axis, a first rotational joint, and a second rotational joint of the manipulator.
Figure 4B:
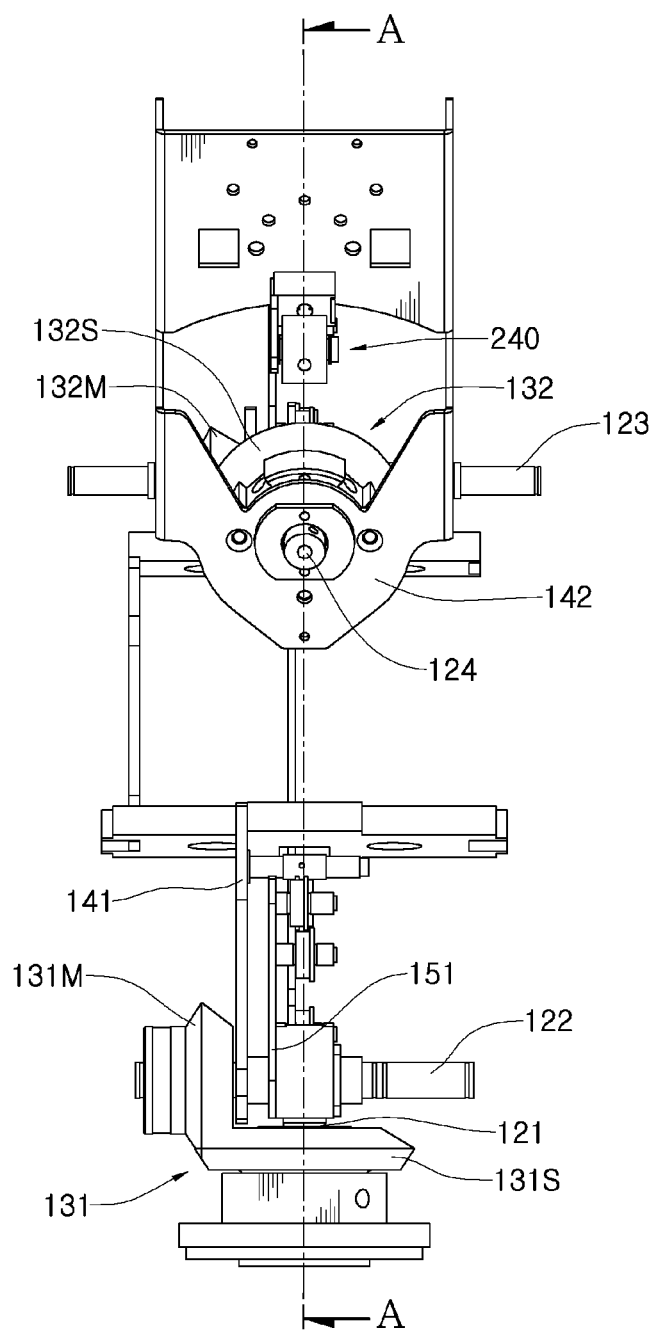
FIG. 4B is a front view of the manipulator shown in FIG. 4A.
Figure 4C:
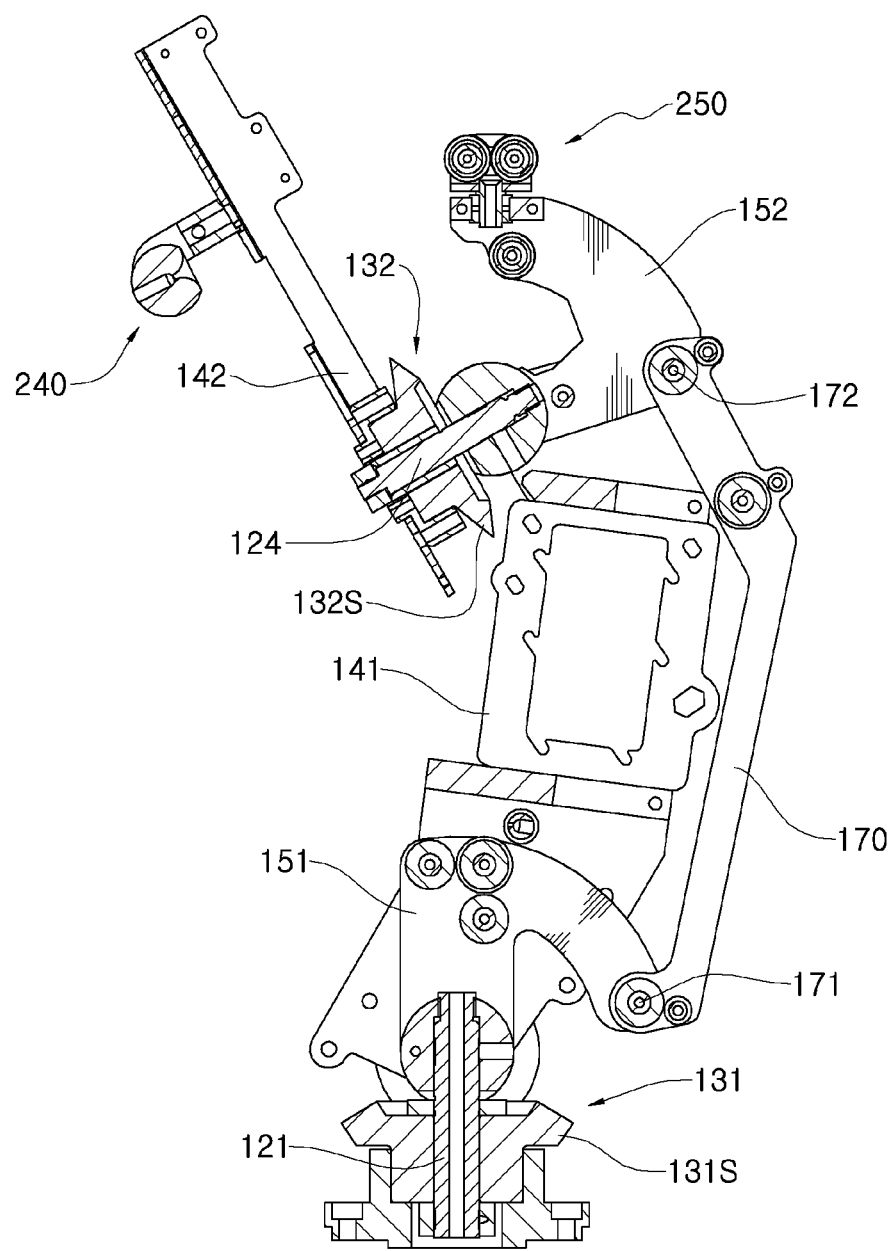
FIG. 4C is a cross-sectional view showing a state where a second rotation part of the manipulator shown in FIG. 4A rotates about a third axis.
Figure 5:
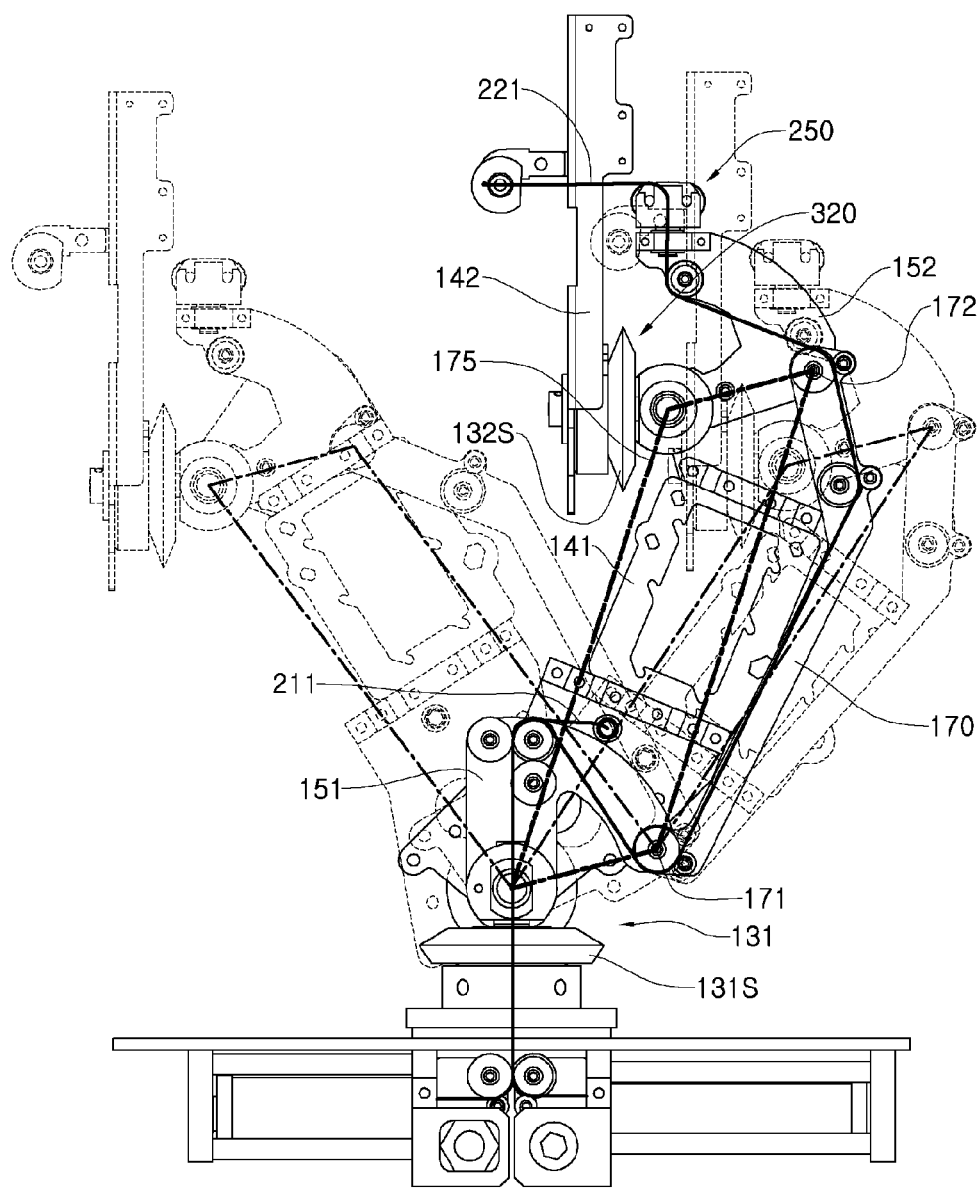
FIG. 5 is a side view of the manipulator which is operated about the second axis.
Figure 6:
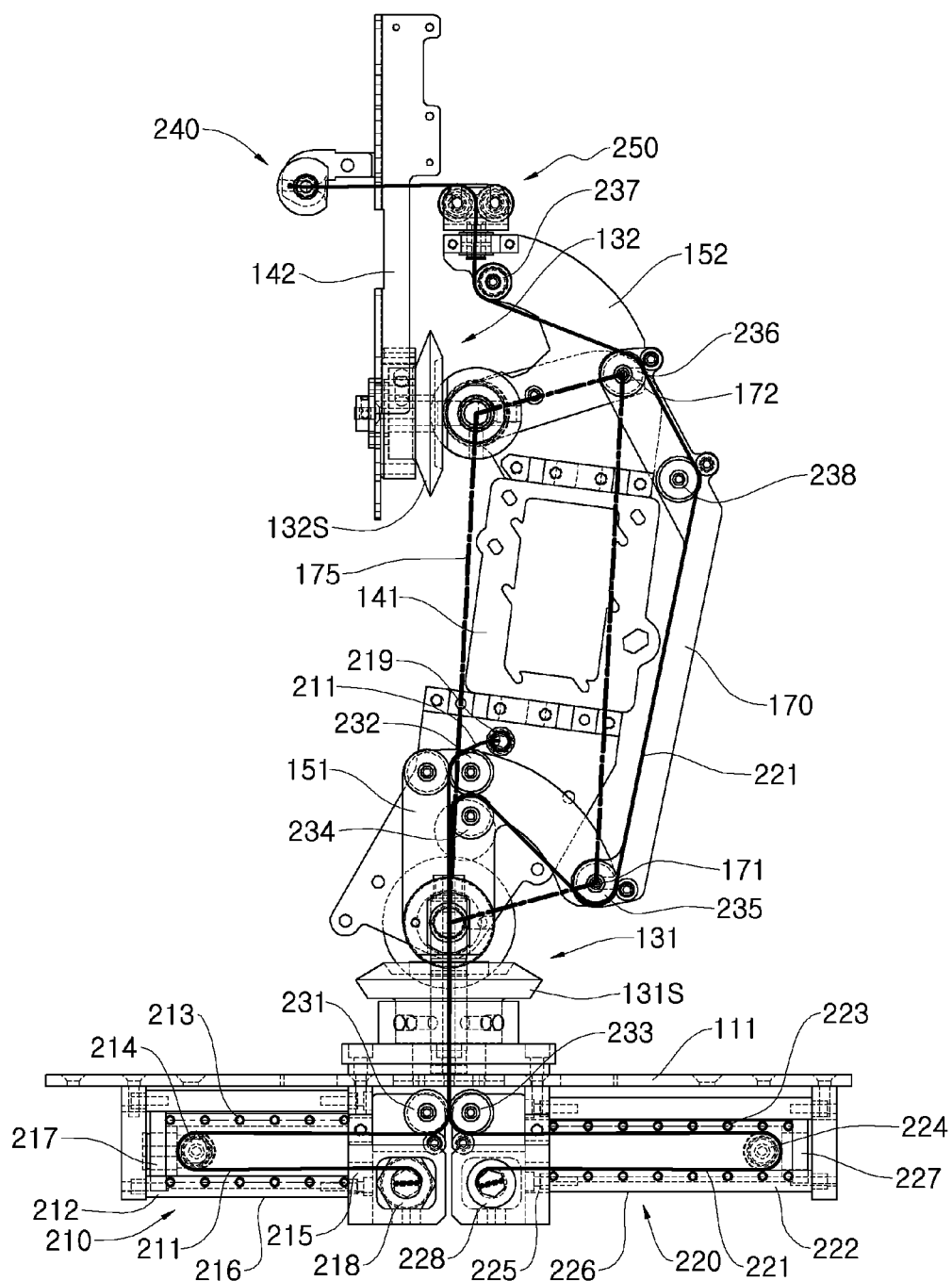
FIG. 6 is a conceptual diagram showing the structure of a weight compensation mechanism.
Figure 7A:
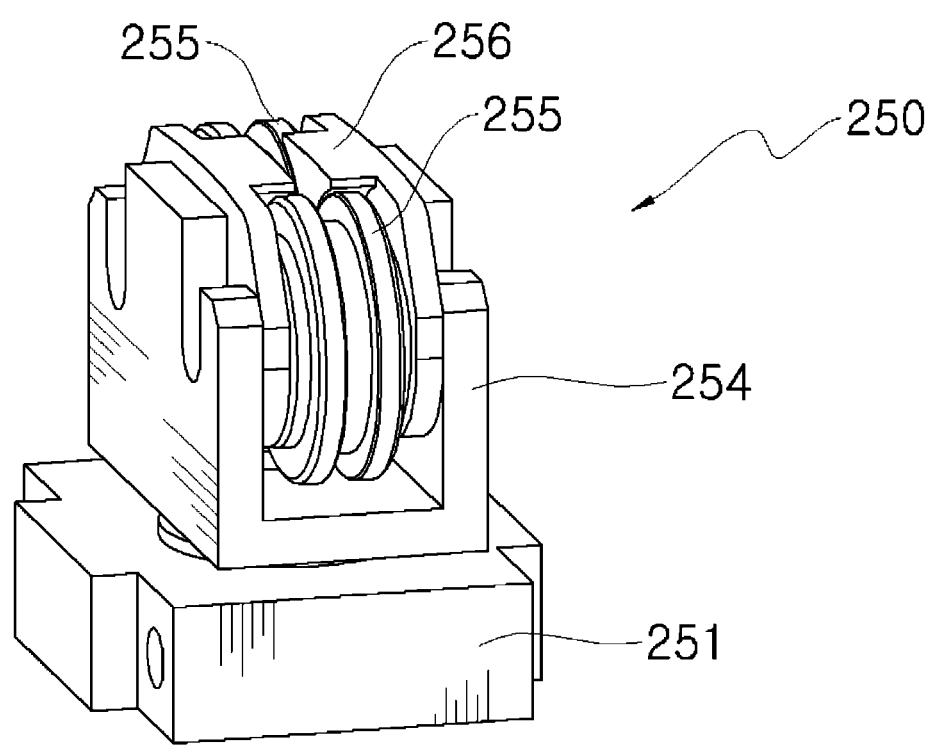
FIG. 7A is a perspective view showing a pulley assembly shown in FIG. 6.
Figure 7B:
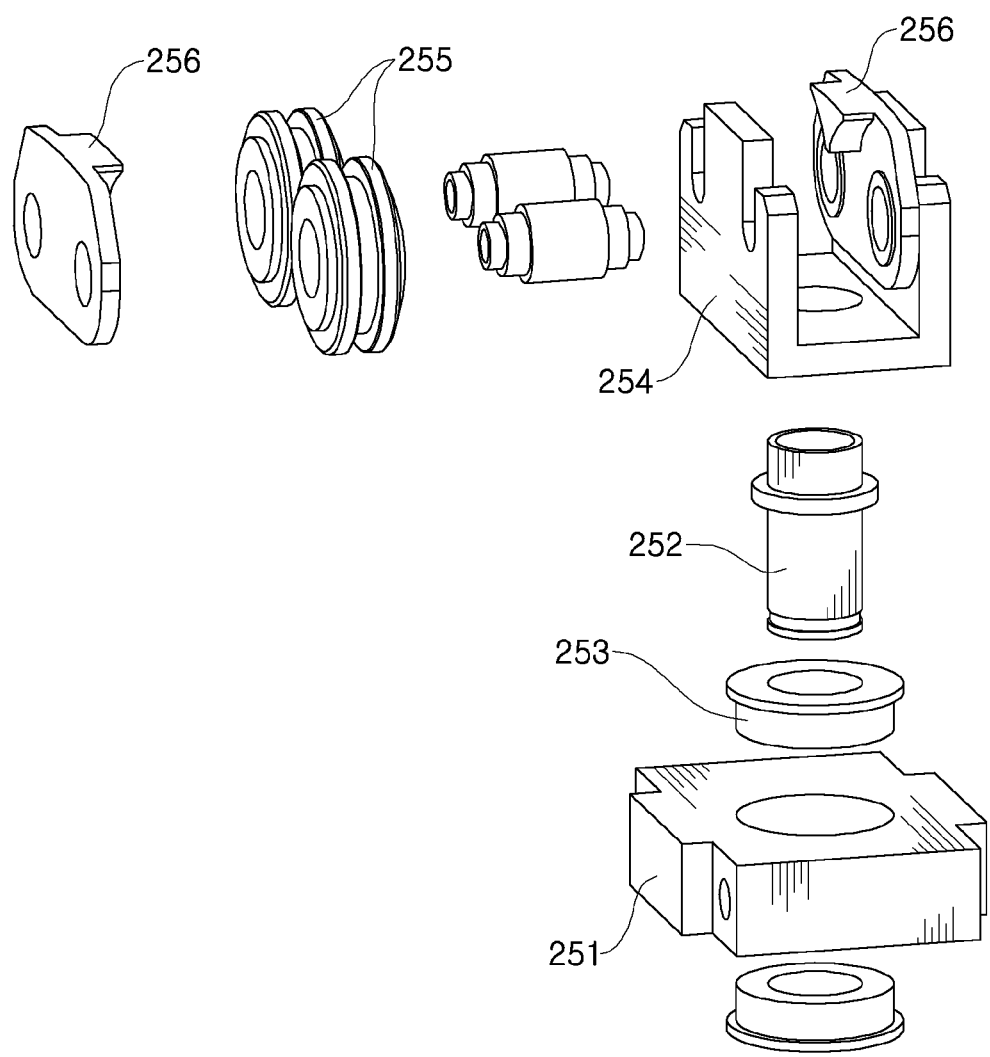
FIG. 7B is an exploded perspective view of a pulley assembly shown in FIG. 6.
Figure 8A:
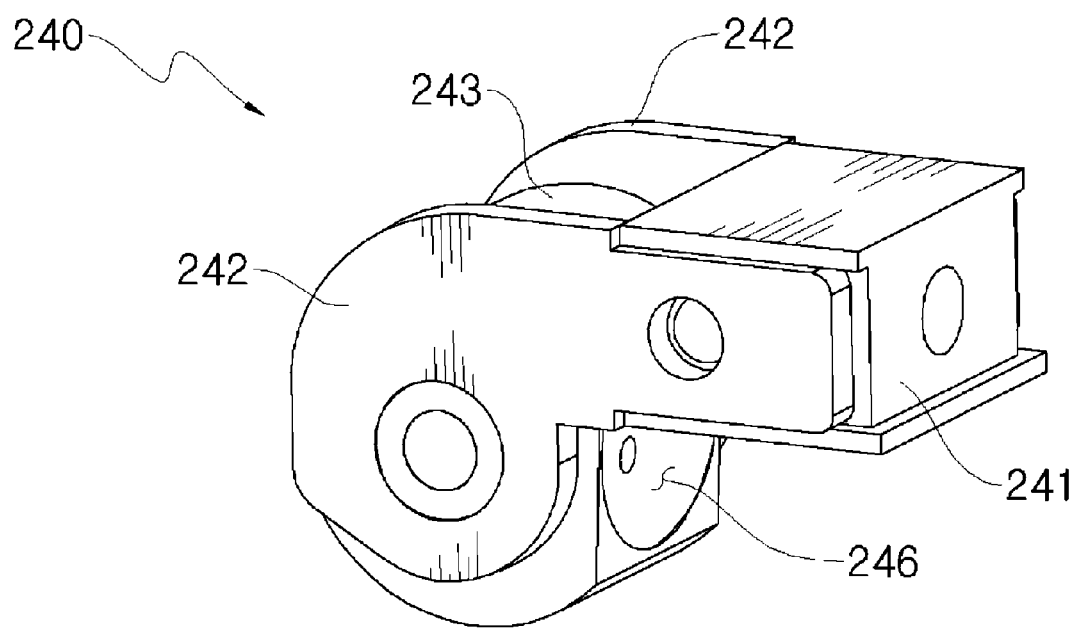
FIG. 8A is a perspective view showing a second wire fixing part which is attached to a second rotation part.
Figure 8B:
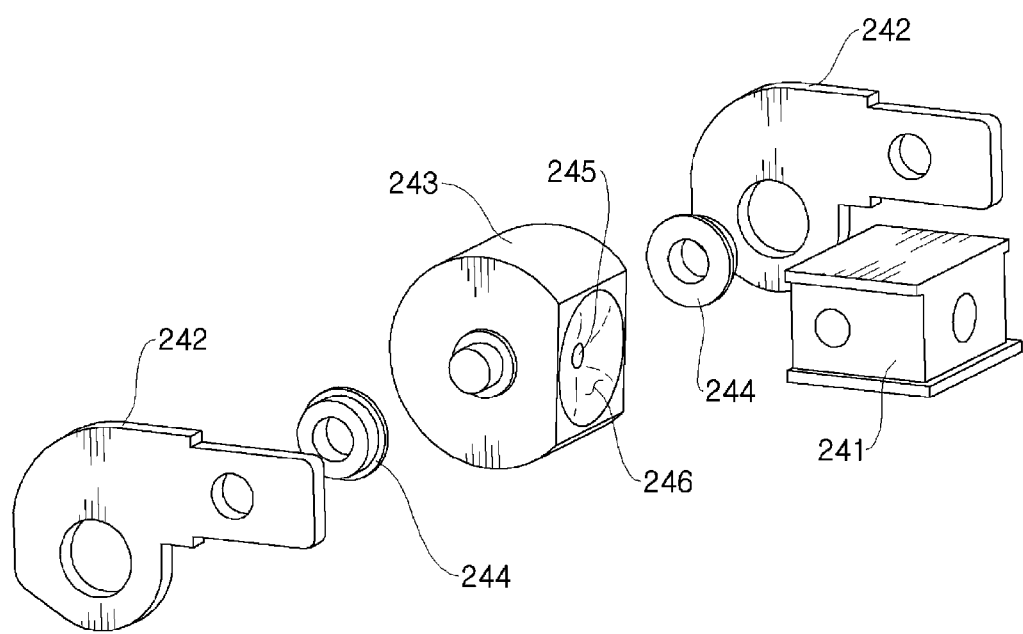
FIG. 8B is an exploded perspective view of the second wire fixing part shown in FIG. 8A.
Figure 8C:
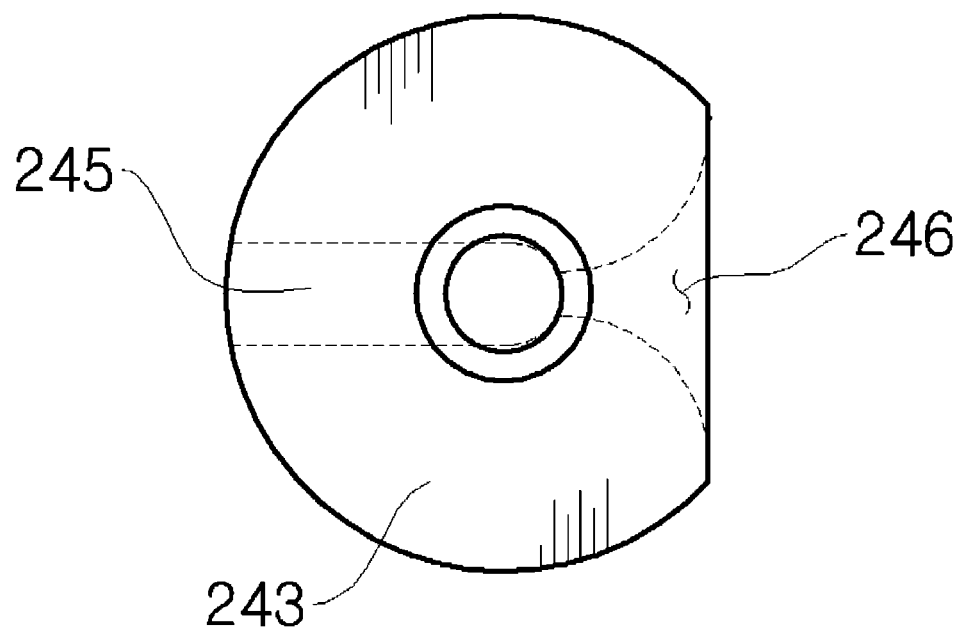
FIG. 8C is a cross-sectional view of a second wire fixture shown in FIG. 8B.
Figure 9:
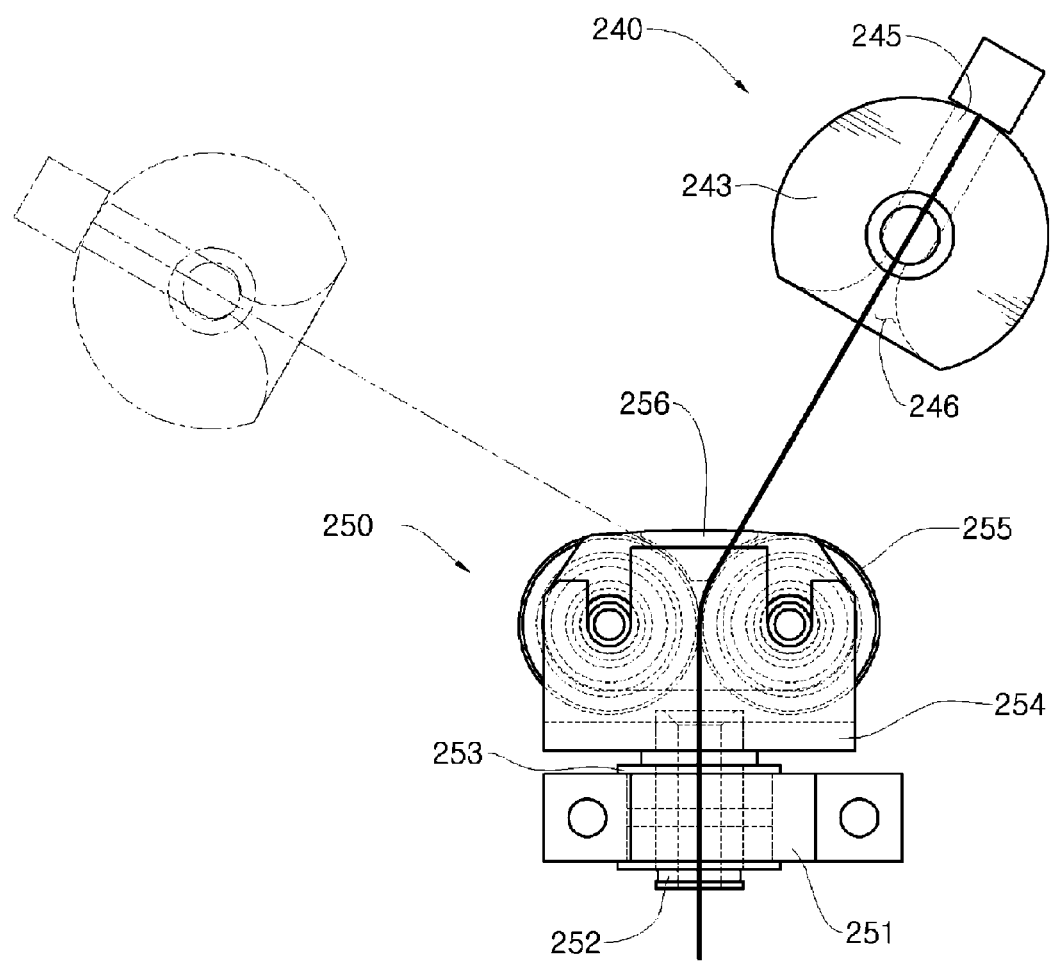
FIG. 9 is a conceptual diagram illustrating the operation of the second rotation part which rotates about the third axis.

In the drawings, FIG. 1 is a perspective view showing a face robot according to the disclosure, FIG. 2 is an operating conceptual diagram of a manipulator, which shows the operation of the face robot shown in FIG. 1, FIG. 3A is a front view of the face robot shown in FIG. 1, and FIG. 3B is a side view of the face robot shown in FIG. 1. FIG. 4A is a conceptual diagram showing the parallelogram connecting structure of a second axis, a third axis, a first rotational joint, and a second rotational joint of the manipulator, FIG. 4B is a front view of the manipulator shown in FIG. 4A, FIG. 4C is a cross-sectional view showing a state where a second rotation part of the manipulator shown in FIG. 4A rotates about a third axis, and FIG. 5 is a side view of the manipulator which is operated about the second axis. FIG. 6 is a conceptual diagram showing the structure of a weight compensation mechanism, FIG. 7A is a perspective view showing a pulley assembly shown in FIG. 6, and FIG. 7B is an exploded perspective view of a pulley assembly shown in FIG. 6. FIG. 8A is a perspective view showing a second wire fixing part which is attached to a second rotation part, FIG. 8B is an exploded perspective view of the second wire fixing part shown in FIG. 8A, FIG. 8C is a cross-sectional view of a second wire fixture shown in FIG. 8B, and FIG. 9 is a conceptual diagram illustrating the operation of the second rotation part which rotates about the third axis.

As shown in FIGS. 1 to 3B, the face robot has a structure in which a manipulator 100 is attached to a top surface of a base 110 and a robot's face 101 is attached to the distal end of the manipulator 100. In addition, a weight compensation mechanism 200 which compensates the weight of the manipulator 100 is attached to the base 110. Here, the manipulator 100 is configured to be operated through the rotation about a first axis (yaw) 121, a second axis (pitch) 122, a third axis (pitch) 123, and a fourth axis (roll) 124. In addition, a first rotational bracket 151 is fixed to the first axis 121 so as to rotate about the first axis 121, a second rotational bracket 152 is attached to the third axis 123 so as to rotate about the third axis 123, and both ends of a connecting link 170 are respectively connected to the first rotational bracket 151 and the second rotational bracket 152 so as to be rotatable through rotational joints 171 and 172. Here, the rotational joint which connects the first rotational bracket 151 and the connecting link 170 to each other is referred to as the 'first rotational joint 171', and the rotational joint which connects the second rotational bracket 152 and the connecting link 170 to each other is referred to as the 'second rotational joint 172'.

In the manipulator 100 with such a structure, the second axis 122, the third axis 123, the first rotational joint 171, and the second rotational joint 172 constitute the parallelogram structure (see 175 of FIG. 6).

Hereinafter, the manipulator which includes the weight compensation mechanism with such a structure will be specifically described.

As shown in FIGS. 1 and 2, a base plate 111 is fixed to the top surface of the base 110 with a space therebetween, the manipulator 100 is attached to the top surface of the base plate 111, and the robot's face 101 is attached to the free end of the manipulator 100. Meanwhile, the manipulator 100 includes a first rotation part 141 which freely rotates about the first axis (yaw) 121 perpendicularly fixed to the center of the base plate 111 and the second axis (pitch) 122 perpendicularly positioned with respect to the first axis 121 and a second rotation part 142 which freely rotates about the third axis (pitch) 123 attached to the end of the first rotation part 141 so as to be parallel to the second axis (pitch) 122 and the fourth axis (roll) 124 perpendicularly attached with respect to the third axis 123. In addition, the robot's face 101 is attached to the front side of the second rotation part 142. In this way, the robot's face 101 which is attached to the second rotation part 142 has four degrees of freedom.

Hereinafter, the connecting relationship between the first rotation part 141 and the second rotation part 142 will be specifically described.

As shown in FIGS. 4A to 4C, the first rotation part 141 is positioned on the top surface of the base plate 111, a fixation gear 131S of a first differential bevel gear 131 is fixed to the base plate 111, the first axis 121 is fixed to the center of the fixation gear 131S, and the first rotational bracket 151 is attached to the upper end of the first axis 121 so as to be rotatable. In addition, the second axis 122 is attached to the center of two movement gears 131M of the first differential bevel gear 131 so as to be rotatable, and the lower end of the first rotation part 141 and the first rotational bracket 151 are respectively attached to the second axis 122 so as to be rotatable.

Meanwhile, the second rotation part 142 is attached to the upper end of the first rotation part 141, and a second differential bevel gear 132 is attached so as to be rotatable about the third axis 123 and the fourth axis 124, where a fixation gear 132S of the second differential bevel gear 132 is fixed to the rear surface of the second rotation part 142 and the fourth axis 124 fixed to the center of the fixation gear 132S is attached to the upper end of the first rotation part 141 so as to be rotatable. In addition, the third axis 123 is attached to the center of two movement gears 132M of the second differential bevel gear 132 so as to be rotatable, and the upper end of the first rotation part 141 and the second rotational bracket 152 are respectively attached to the third axis 123 so as to be rotatable.

As shown in FIG. 1, two first actuators 161 are attached to the lower part of the first rotation part 141 so as to face each other, and are respectively connected to two movement gears 131M of the first differential bevel gear 131 by timing belts, gears, or the like in a direct coupling manner. In addition, two second actuators 162 are attached to the upper part of the first rotation part 141 so as to face each other, and are respectively connected to two movement gears 132M of the second differential bevel gear 132 by timing belts, gears, or the like in a direct coupling manner.

By controlling the operation directions, namely, the rotation directions of two first actuators 161 connected to the second axis 122, the first rotation part 141 rotates about the first axis 121 and the second axis 122.

Specifically, if two first actuators 161 are rotated in the opposite direction (while the rotation directions of the movement gears 131M are equal to each other), the first rotation part 141 rotates about the first axis (yaw) 121, and the first rotational bracket 151 also rotates about the first axis (yaw) 121.

In contrast, if two first actuators 161 are rotated in the same direction (while the rotation directions of the movement gears 131M are opposite to each other), the first rotation part 141 rotates about the second axis (pitch) 122.

If the second rotation part 142 also rotates two second actuators 162 connected thereto in the same direction (while the rotation directions of the movement gears 132M are opposite to each other), the second rotation part 142 rotates about the third axis (pitch) 123. If two second actuators 162 are rotated in the opposite direction (while the rotation directions of the movement gears 132M are equal to each other), the second rotation part 142 rotates about the fourth axis (roll) 124.

Meanwhile, as shown in FIGS. 4A and 5, the first rotational bracket 151 is attached to the second axis 122 so as to be rotatable, and the second rotational bracket 152 is attached to the third axis 123 so as to be rotatable. In addition, both ends of the connecting link 170 are respectively connected to the first rotational bracket 151 and the second rotational bracket 152 by hinges, where one end of the connecting link 170 and the first rotational bracket 151 are connected to each other by the first rotational joint 171, and the other end of the connecting link 170 and the second rotational bracket 152 are connected to each other by the second rotational joint 172. Here, the second axis 122, the first rotational joint 171, the second rotational joint 172, and the third axis 123 constitute the parallelogram structure 175. In this manner, since the first rotational joint 171 and the second rotational joint 172 which connect the connecting link 170, the first rotational bracket 151, and the second rotational bracket 152 to each other constitute the parallelogram structure 175 together with the second axis 122 and the third axis 123, the parallelogram structure may be maintained even if the first rotation part 141 rotates about the second axis 122. Here, the first rotation part 141 and the connecting link 170 corresponding to two long edges of the parallelogram structure 175 move in parallel, and even when the second rotational bracket 152 corresponding to one short edge moves by the rotation of the first rotation part 141, the second rotational bracket moves in parallel to the first rotational bracket 151.

In the manipulator 100 with such a structure, the first rotation part 141 and the second rotation part 142 respectively rotating about the second axis 122 and the third axis 123 receive gravity depending on the position. In addition, hereinbelow, a mechanism for compensating the gravity exerted on the first rotation part 141 and the second rotation part 142 of the manipulator 100 will be described.

As shown in FIG. 6, the weight compensation mechanism 200 is divided into a first weight compensation part 210 which compensates the weight of the first rotation part 141 and a second weight compensation part 220 which compensates the weight of the second rotation part 142.

The first weight compensation part 210 and the second weight compensation part 220 are attached to the bottom surface of the base plate 111, a first wire 211 extending from the first weight compensation part 210 is attached to the first rotation part 141, and a second wire 221 extending from the second weight compensation part 220 is attached to the second rotation part 142.

Specifically, the inside of a case 212 of the first weight compensation part 210 is provided with a guide bar 216 which is positioned so as to extend to the outside of the base plate 111 about the first axis 121, a slider 217 which moves along the guide bar 216, a sheave 214 which is attached to the slider 217, a coil spring 213 which is positioned along the guide bar 216 and provides an elastic force enabling the slider 217 to move to the outside of the base plate 111, a tension controller 218 which is attached to the case 212 and to which one end of the first wire 211 is fixed, a first pulley 231 which is attached to the bottom surface of the base plate 111 and changes the direction of the first wire 211, a second pulley 232 which is attached to the first rotational bracket 151 and changes the direction of the first wire 211, and a fixture 219 which is attached to the first rotation part 141 and to which the other end of the first wire 211 is fixed.

One end of the first wire 211 is fixed to the tension controller 218, the direction of the first wire 211 is switched so that the first wire 211 advances in the direction opposite to the entrance direction at the sheave 214, the direction thereof is switched upward at the first pulley 231 so that the first wire 211 extends upward through the hollow formed in the first axis 121, and the direction thereof is switched at the second pulley 232 so that the other end of the first wire 211 is fixed to the fixture 219 attached to the first rotation part 141.

When looking into the operating relationship of the first weight compensation part 210 with such a structure, the first rotation part 141 rotates about the second axis (pitch) 122 by the first actuator 161, but the first rotational bracket 151 does not rotate about the second axis 122. Therefore, when the first rotation part 141 rotates about the second axis 122 to thereby widen a gap between the fixture 219 fixed to the first rotation part 141 and the second pulley 232 attached to the first rotational bracket 151, that is, the first rotation part 141 is inclined forward or backward, the first wire 211 is tensioned while the first wire 211 is pulled toward the fixture 219. At this time, since the slider 217 of the first weight compensation part 210 moves toward the spring fixing part 215 by the tension of the first wire 211, the coil spring 213 is compressed. In this way, the elastic restoring force generated by the compression of the coil spring 213 compensates the torque (weight) generated as the first rotation part 141 rotates about the second axis 122.

Meanwhile, the inside of a case 222 of the second weight compensation part 220 is provided with a coil spring 223, a slider 227, a sheave 224, a guide bar 226, and a third pulley 233 which has the same function as that of the first pulley 231 as in the above-described first weight compensation part 210, and one end of the second wire 221 is fixed to a tension controller 228. Furthermore, the second wire 221 advances in the direction opposite to the entrance direction at the sheave 224, and the direction thereof is switched at the third pulley 233 so that the other end of the second wire 221 is fixed to the second wire fixing part 240 attached to the second rotation part 142. In addition, the second wire 221 extending from the second weight compensation part 220 passes a fourth pulley 234 attached to the first rotational bracket 151, a fifth pulley 235 attached to the portion of the first rotational joint 171, a sixth pulley 236 attached to the portion of the second rotational joint 172, a seventh pulley 237 attached to the second rotational bracket 152, and a pulley assembly 250 attached to the second rotational bracket 152, so that the other end of the second wire 221 is fixed to the second wire fixing part 240 attached to the second rotation part 142. Here, as shown in FIG. 4A, an auxiliary pulley 238 and the like which support the second wire 221 may be further attached depending on the type of the connecting link 170, and the above-described pulleys may be changed in various forms in accordance with the switching directions of the wires.

Hereinafter, the pulley assembly 250 and the second wire fixing part 240 will be specifically described.

As shown in FIGS. 7A and 7B, the pulley assembly 250 includes a fixing block 251 which is fixed to the upper end of the second rotational bracket 152, a hollow shaft 252 which is rotatably attached to the perpendicular hollow of the fixing block 251 by a bearing 253, a rotation holder 254 which is fixed to the upper end of the hollow shaft 252 and is opened upward, two pulleys 255 which are attached to the rotation holder 254, and a second wire guide 256 which is attached to the rotation holder 254 and guides the advancing direction of the second wire 221 exiting between two pulleys 255 so that the second wire is directed toward the second wire fixing part 240. In addition, the second wire 221 is positioned inside a groove formed along the circumferential surface of the pulley 255 while the circumferential surfaces of two pulleys 255 are in contact with each other, the pulley 255 rotates as the second wire 221 moves, and the rotation holder 254 rotates toward the second rotation part 142 as the second rotation part 142 rotates about each of the third axis 123 and the fourth axis 124.

Meanwhile, the second wire 221, of which the direction is switched by the seventh pulley 237, passes through the hollow of the hollow shaft 252 and passes between two pulleys 255 of the pulley assembly 250. In addition, after the direction of the second wire 221 is switched by the pulley 255, the second wire 221 passes through the second rotation part 142 and is fixed to the second wire fixing part 240 which is attached to the front surface of the second rotation part 142.

Furthermore, as shown in FIGS. 8A to 8C, the second wire fixing part 240 includes a fixing block 241 which is fixed to the front side of the second rotation part 142, supporting brackets 242 which are respectively fixed to both sides of the fixing block 241 fixed to the second rotation part 142, and a wire fixture 243 which is positioned between the supporting brackets 242 and is rotatably attached to the supporting brackets 242 by bearings 244. In addition, the fixing block 241 is provided with a through hole which enables the second wire 221 to enter toward the wire fixture 243, and a through hole 245 is provided so that the wire fixture 243 or the second wire 221 passes therethrough, where a slope is formed in an entrance part 246 of the through hole 245 formed in the wire fixture 243. The slope formed in the entrance part 246 is provided so as to prevent the second wire 221 from being bent perpendicularly when the wire fixture 243 rotates, so that the second wire 221 is maintained in a smoothly curved state by the slope of the entrance part 246 even when the wire fixture 243 rotates. In this way, since the second wire 221 is smoothly curved, it is possible to prevent the second wire 221 from being cut and prevent the wire fixture 243 from being broken in advance. Meanwhile, the end of the second wire 221 passes the inside of the through hole 245 of the wire fixture 243 or passes through the through hole 245 so as to be fixed to the outside thereof.

As shown in FIG. 9, the pulley assembly 250 and the second wire fixing part 240 support the second wire 221 so as to smoothly move when the second rotation part 142 rotates about the third axis (pitch) and the fourth axis (roll).

Herebelow, the weight compensation with respect to the second rotation part 142 will be described.

In the case where the position of the first rotation part 141 is fixed and the second rotation part 142 rotates about the third axis 123, since the first rotation part 141 is fixed, the position of the second rotational bracket 152 included in the parallelogram structure 175 is also fixed and the position of the rotatable pulley assembly 250 fixed to the second rotational bracket 152 is also fixed.

Therefore, when the second rotation part 142 rotates about the third axis 123, the second wire fixing part 240 rotates along the second rotation part 142 about the third axis 123 to thereby pull the second wire 221, wherein when the second wire 221 moves toward the second wire fixing part 240, the slider 227 of the second weight compensation part 220 moves toward the spring fixing part 225 due to the tension so as to compress the coil spring 223. In this way, the elastic restoring force generated by the compression of the coil spring 223 compensates the torque (gravity) generated when the second rotation part 142 rotates about the third axis 123.

Meanwhile, when the first rotation part 141 rotates about the second axis 122 while the rotation of the second rotation part 142 rotating about the third axis 123 is fixed, the second rotational bracket 152 rotates about the second axis 122 along the first rotation part 141, and moves in parallel at the base plate 111 due to the parallelogram structure 175. Therefore, when the first rotation part 141 rotates about the second axis 122 so that the robot's face 101 is inclined forward, the distance from the second wire fixing part 240 to the pulley assembly 250 is widened as the second rotational bracket 152 moves in parallel. Conversely, when the first rotation part 141 rotates about the second axis 122 so that the robot's face 101 is raised backward, the distance from the second wire fixing part 240 to the pulley assembly 250 is narrowed. In this case, the second wire 221 moves and the second weight compensation part 220 compensates the torque (gravity). At the same time, the torque (gravity) with the rotation of the first rotation part 141 is compensated by the first weight compensation part 210.

Meanwhile, when the second rotation part 142 rotates about the third axis 123 while the rotation of the first rotation part 141 is fixed, the second wire fixing part 240 attached to the second rotation part 142 moves in the direction moving away from or close to the pulley assembly 250. At this time, since the other end of the second wire 221 is fixed to the second wire fixing part 240, the second wire 221 is tensioned. Due to the generated tension, the slider 227 of the second weight compensation part 220 moves, so that the coil spring 223 of the second weight compensation part 220 is expanded and contracted to compensate the torque (gravity) of the second rotation part 142. Therefore, the second rotation part 142 does not rotate any more due to the effect of the gravity, and maintains the current posture in such a weightless state.

If the first rotation part 141 rotates about the second axis 122 at the same time when the second rotation part 142 rotates about the third axis 123, as described above, the first weight compensation part 210 and the second weight compensation part 220 are respectively operated so as to compensate the torques (gravities) of the first rotation part 141 and the second rotation part 142. However, as shown in FIG. 5, at the time when the first rotation part 141 rotates about the second axis 122, when the rotation of the first rotation part 141 is compensated so that the second rotation part 142 is maintained perpendicularly while the second rotation part 142 rotates about the third axis 123, specifically, when the second rotation part 142 turns forward and backward while being maintained perpendicularly even when the first rotation part 141 rotates, the distance between the second wire fixing part 240 and the pulley assembly 250 is uniform. In this case, since the second wire 221 does not move, the torque of the second weight compensation part 220 does not change, and the changed torque (gravity) is compensated only at the first weight compensation part 210.

Hereinafter, the compensation with respect to the gravity generated when the second rotation part 142 rotates about the fourth axis 124 will be described.

The second rotation part 142 is rotatable about the fourth axis 124. In this manner, when the second rotation part 142 rotates about the fourth axis 124, the gap between the second wire fixing part 240 attached to the second rotation part 142 and the pulley assembly 250 attached to the second rotational bracket 152 is widened or narrowed. Therefore, the pulley assembly 250 is attached so as to be rotatable about the hollow shaft 252, and hence the pulley assembly 250 rotates so as to be directed toward the position of the second wire fixing part 240. Namely, the second wire 221 which extends from the second wire fixing part 240 through the pulley 255 of the pulley assembly 250 moves while being pulled toward the second wire fixing part 240 or vice versa as much as a variation in distance between the pulley assembly 250 and the second wire fixing part 240 when the second rotation part 142 rotates about the fourth axis 124. This also compensates the torque (gravity) of the second rotation part 142 at the second weight compensation part 220.

In this way, the weight compensation mechanism 200 compensates the influence caused by the gravity and exerted on the second axis 122, the third axis 123, and the fourth axis 124 except for the first axis 121 which is parallel to the direction of the gravity when the manipulator 100 is operated. Since the first axis 121 is parallel to the direction of the gravity, no variation occurs in the torque even when the first rotation part 141 and the second rotation part 142 rotate about the first axis 121.

Meanwhile, the tension controllers 218 and 228 which are attached to the above-described weight compensation mechanism 200 are respectively equipped with functions of adjusting the tensions of the first wire 211 and the second wire 221 which are attached thereto. The function of adjusting the wire's tension may be change in various forms. As an example thereof, although not shown in the drawings, a bolt is perforated so as to form a through hole therein, a wire passes the through hole to be fixed thereto, and the fixed bolt is fastened to a nut which is fixed to a case. If the bolt of the tension controller with such a structure is rotated, the wire is wrapped around the bolt to thereby minutely adjust the tension of the wire. Preferably, a self-locking function is provided between the bolt and the nut.

As described above, in the manipulator with the weight compensation mechanism and the face robot using the same according to the disclosure, since the influence (torque) of gravity generated by the rotation of the rotation part constituting the manipulator may be compensated by the elastic restoring force of the spring, there is an advantage in that the power of the actuator rotating the rotation part may be reduced. In addition, since the rotation part may be driven by small power, there is an advantage in that the weight of the manipulator and the face robot may be reduced. Therefore, there is an advantage in that energy-saving effect may be obtained and manufacturing cost may be reduced.

Furthermore, in the manipulator with the weight compensation mechanism and the face robot using the same according to the disclosure, since the gravity is compensated at the outside of the manipulator by the connection with the rotation part through the wire so as to compensate the gravity, there is an advantage in that the gravity may be compensated without increasing the volume of the manipulator. Therefore, there is an advantage in that the weight compensation mechanism may be installed without increasing the thickness and the length of the narrow neck part compared to the robot's face.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A manipulator with a weight compensation mechanism, the manipulator having rotation parts connected to a plurality of axes rotating about their axes, the manipulator comprising:

a weight compensation mechanism that supports wires connected to the rotation parts receiving gravity in a rotation state by a spring and compensates an influence of gravity exerted on the rotation parts when the wires pressurize the spring or cancel the pressurized state thereof due to the rotation of respective rotation parts by the elastic restoring force of the spring, wherein the axes of the manipulator are divided into a first axis (yaw) matching the direction of gravity, a second axis (pitch), a third axis (pitch), and a fourth axis (roll), wherein the manipulator includes a first rotation part that rotates about each of the first axis and the second axis and a second rotation part that rotates about each of the third axis and the fourth axis, and wherein a first wire of the weight compensation mechanism is connected to the first rotation part and a second wire of the weight compensation mechanism is connected to the second rotation part, thereby compensating the gravity generated when the first rotation part rotates about the second axis and the second rotation part rotates about the third axis and the fourth axis.

2. The manipulator according to claim 1, wherein the manipulator includes a first rotational bracket that is attached to the first axis fixed to a base plate and is rotatable about the first axis, a second rotational bracket that is rotatable about the third axis, and a connecting link that is connected to each of the first rotational bracket and the second rotational bracket through a first rotational joint and a second rotational joint so as to be relatively rotatable, and the second axis, the third axis, the first rotational joint, and the second rotational joint constitute a parallelogram structure.

3. The manipulator according to claim 2, wherein the weight compensation mechanism is divided into a first weight compensation part that compensates the gravity of the first rotation part and a second weight compensation part that compensates the weight of the second rotation part, the weight compensation mechanism is installed at the bottom surface of the base plate provided with the manipulator, and the first wire and the second wire extend in the direction of the first axis so as to be respectively connected to the first rotation part and the second rotation part.

4. The manipulator according to claim 3, wherein the first weight compensation part includes a guide bar that is fixed to the outside of the base plate at the first axis, a slider that moves along the guide bar, a sheave that is attached to the slider, a coil spring that provides an elastic restoring force of pushing the slider to the outside of the base plate, a tension controller to which one end of the first wire is fixed, and a first pulley that switches the direction of the first wire so that it extends in the direction of the first axis, and wherein the first wire of which one end is fixed to the tension controller extends in the direction of the first axis through the sheave and the first pulley and is fixed to the first rotation part.

5. The manipulator according to claim 4, wherein the first wire passes through a hollow of the first axis and passes a second pulley attached to the first rotational bracket so that the other end of the first wire is fixed to a fixture attached to the first rotation part.

6. The manipulator according to claim 3, wherein the second weight compensation part includes a guide bar that is fixed to the outside of the base plate at the first axis, a slider that moves along the guide bar, a sheave that is attached to the slider, a coil spring that provides an elastic restoring force of pushing the slider to the outside of the base plate, a tension controller to which one end of the second wire is fixed, and a third pulley which switches the direction of the second wire so that it extends in the direction of the first axis, and wherein the second wire of which one end is fixed to the tension controller is fixed to the second rotation part through the sheave and the first pulley, and pulleys supporting the second wire are attached to the first rotational bracket, the connecting link, and the second rotational bracket.

7. The manipulator according to claim 6, wherein the second wire extends while being supported on the pulleys in a parallelogram structure along the first rotational bracket, the connecting link, and the second rotational bracket.

8. The manipulator according to claim 6, wherein a second wire fixing part is attached to the second rotation part, and wherein the second wire fixing part includes a wire fixture that is rotatably attached to the second rotation part and a through hole that is formed in the lateral direction of the wire fixture so that the second wire passes therethrough and forms a slope in an entrance part to which the second wire is inserted.

9. The manipulator according to claim 8, wherein the second wire fixing part includes a fixing block that is attached and fixed to the front side of the second rotation part and supporting brackets that are fixed to both side surfaces of the fixing block and support the wire fixing part so as to be rotatable, and the other end of the second wire passes through the second rotation part and the fixing block and is fixed to the inside of the through hole of the wire fixing part or the outer peripheral surface of the wire fixing part.

10. The manipulator according to claim 6, wherein a pulley assembly, which supports the second wire so that the second wire is positioned toward the second rotation part, is attached to the second rotational bracket, and the pulley assembly is rotatably attached to the second rotational bracket so as to be directed toward the second rotation part rotating about each of the third axis and the fourth axis.

11. The manipulator according to claim 10, wherein the pulley assembly includes a hollow shaft that is rotatably attached to the second rotational bracket, a rotation holder that is fixed to the upper end of the hollow shaft, and a pulley that is attached to the inside of the rotation holder, and the second wire passes thorough the inside of the hollow shaft and extends toward the second rotation part through the pulley.

12. The manipulator according to claim 11, wherein a second wire guide is attached to the rotation holder so that the second wire is guided toward the second rotation part.

13. The manipulator according to claim 11, wherein a fourth pulley which supports the second wire is attached to the first rotational bracket, and pulleys which support the second wire so that the second wire extends toward the pulley assembly are attached to the connecting link.

14. The manipulator according to claim 2, wherein in the manipulator, a first differential bevel gear is attached between the first rotation part and a base so that the first rotation part rotates about the first axis and the second axis and a second differential bevel gear is attached between the first rotation part and the second rotation part so that the second rotation part rotates about the third axis and the fourth axis.

15. The manipulator according to claim 14, wherein the first differential bevel gear includes a fixation gear that is fixed to the upper end of the first axis and two movement gears that are rotatably attached to the second axis, the first rotational bracket is fixed to the upper end of the first axis, the second axis is rotatably attached to the first rotational bracket, and the first rotation part is rotatably attached to the second axis.

16. The manipulator according to claim 15, wherein two first actuators are attached to the first rotation part, two first actuators are connected to two movement gears so as to rotate the movement gears, and the first rotational bracket and the first rotation part rotate about the first axis or the first rotation part rotates about the second axis in accordance with the rotation directions of the movement gears.

17. The manipulator according to claim 14, wherein the second differential bevel gear includes a fixation gear which is fixed to the second rotation part and of which the center is fixed with the fourth axis and two movement gears that are rotatably attached to the third axis, the second rotational bracket is rotatably fixed to the end of the fourth axis, the third axis is rotatably attached to the second rotational bracket, and the second rotation part is rotatably attached to the third axis.

18. The manipulator according to claim 17,
wherein two second actuators are attached to the first rotation part, two second actuators are connected to two movement gears so as to rotate the movement gears, and the second rotation part rotates about the third axis or the second rotation part rotates about the fourth axis in accordance with the rotation directions of the movement gears.

19. The manipulator according to claim 4,
wherein the tension controller is a self-locking bolt to which one end of the first wire is fixed, and the self-locking bolt is fastened to a nut fixed to the first weight compensation part.

20. The manipulator according to claim 6,
wherein the tension controller is a self-locking bolt to which one end of the second wire is fixed, and the self-locking bolt is fastened to a nut fixed to the second weight compensation part.

21. A face robot comprising:
a manipulator in which rotation parts connected to a plurality of axes rotate about their axes; and
a weight compensation mechanism that supports wires connected to the rotation parts receiving gravity in a rotation state by a spring and compensates an influence of gravity exerted on the rotation parts when the wires pressurize the spring or cancel the pressurized state thereof due to the rotation of respective rotation parts by the elastic restoring force of the spring,
wherein the axes of the manipulator are divided into a first axis (yaw) matching the direction of gravity, a second axis (pitch), a third axis (pitch), and a fourth axis (roll),
wherein the manipulator includes a first rotation part that rotates about each of the first axis and the second axis and a second rotation part that rotates about each of the third axis and the fourth axis,
wherein a first wire of the weight compensation mechanism is connected to the first rotation part and a second wire of the weight compensation mechanism is connected to the second rotation part, thereby compensating the gravity generated when the first rotation part rotates about the second axis and the second rotation part rotates about the third axis and the fourth axis, and
wherein a robot's face is attached to the second rotation part.

* * * * *